Jan. 31, 1961   J. HIMKA   2,969,977
WINDOW REGULATOR
Original Filed Jan. 20, 1954   3 Sheets-Sheet 1

INVENTOR
John Himka
BY L.D. Burch
ATTORNEY

Jan. 31, 1961 J. HIMKA 2,969,977
WINDOW REGULATOR
Original Filed Jan. 20, 1954
3 Sheets-Sheet 2
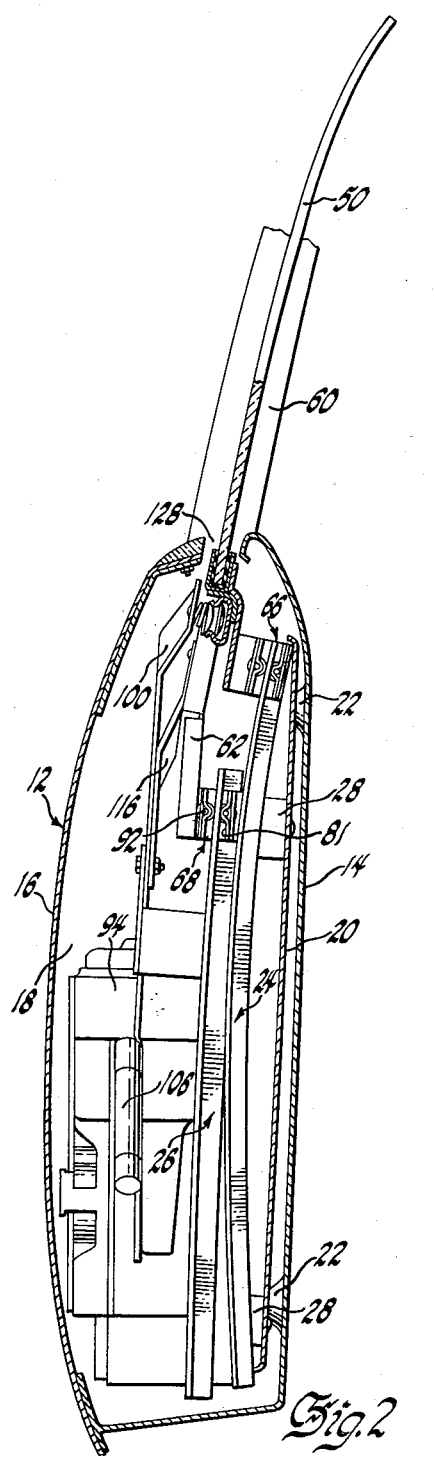
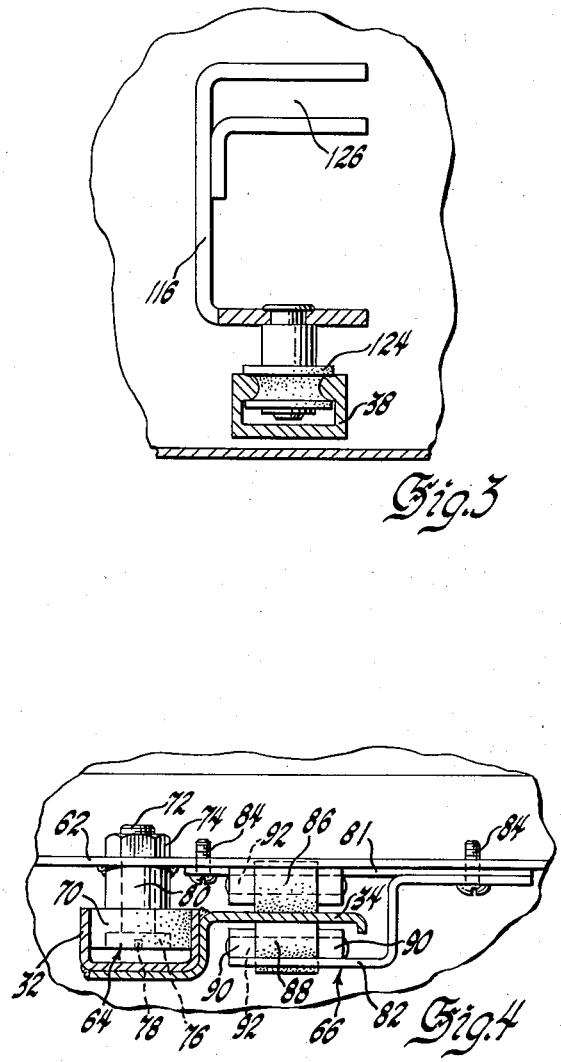
INVENTOR
John Himka
BY L. D. Burch
ATTORNEY Jan. 31, 1961        J. HIMKA        2,969,977
WINDOW REGULATOR Original Filed Jan. 20, 1954        3 Sheets-Sheet 3

INVENTOR
John Himka
BY L. D. Burek
ATTORNEY.

United States Patent Office 2,969,977
Patented Jan. 31, 1961

2,969,977

WINDOW REGULATOR

John Himka, Farmington, Mich., assignor to General Motors Corporation, Detroit, Mich., a corporation of Delaware Continuation of application Ser. No. 405,135, Jan. 20, 1954. This application Mar. 9, 1959, Ser. No. 798,308

9 Claims. (Cl. 268—124)

This invention relates to window regulators generally and in particular to window regulators for use with automotive or other vehicles for raising or lowering a curved window glass member.

This application is a continuation of my co-pending application Serial No. 405,135, filed January 20, 1954, now abandoned.

In the past automotive vehicles have had plane surfaced or flat window glass members which were adapted to be raised or lowered from within a vehicle door, side panel or the like. The principal concern in moving such plane surfaced members is their vertical movement with but minor concern for such horizontal movement as is required to effect proper sealing of the window in its raised or closed position. Automotive designs have now made it desirable to be able to use curved window glass members with automotive vehicles. The adaptation of such curved members to stationary mountings presents but few problems. However, the movement of a curved member from within a housing structure to a raised or closed position in which there is proper alignment and good weather sealing involved concern not only for vertical movement but for specific vertical, horizontal and transverse movement to enable the curved member to pass easily through an access of minimum width without adverse strain and to effect the required closure.

It is now proposed to provide a window regulator or lift mechanism for moving a window glass member of compound curvature into a closed position in conformance with body panel contours. The movement of such curved member is to be as defined by guide members secured within the housing structure. The curved member is engaged by lift means at both bottom sides to enable controlled positive movement through the specified path of travel. The window glass is restrained against undue vibration or other movement which might cause damage to the glass member and is adapted to pass through an access of minimum width without adverse strain upon its side faces.

In the drawings:

Figure 2 is a cross sectional view taken in the plane of line 2—2 of Figure 1 and viewed in the direction of the arrows thereon.

Figure 3 is a cross sectional view of one of the guide followers as taken in the plane of line 3—3 of Figure 1 and viewed in the direction of the arrows thereon.

Figure 4 is a cross sectional view of another of the guide followers as taken in the plane of line 4—4 of Figure 1 and viewed in the direction of the arrows thereon.

Figure 1:
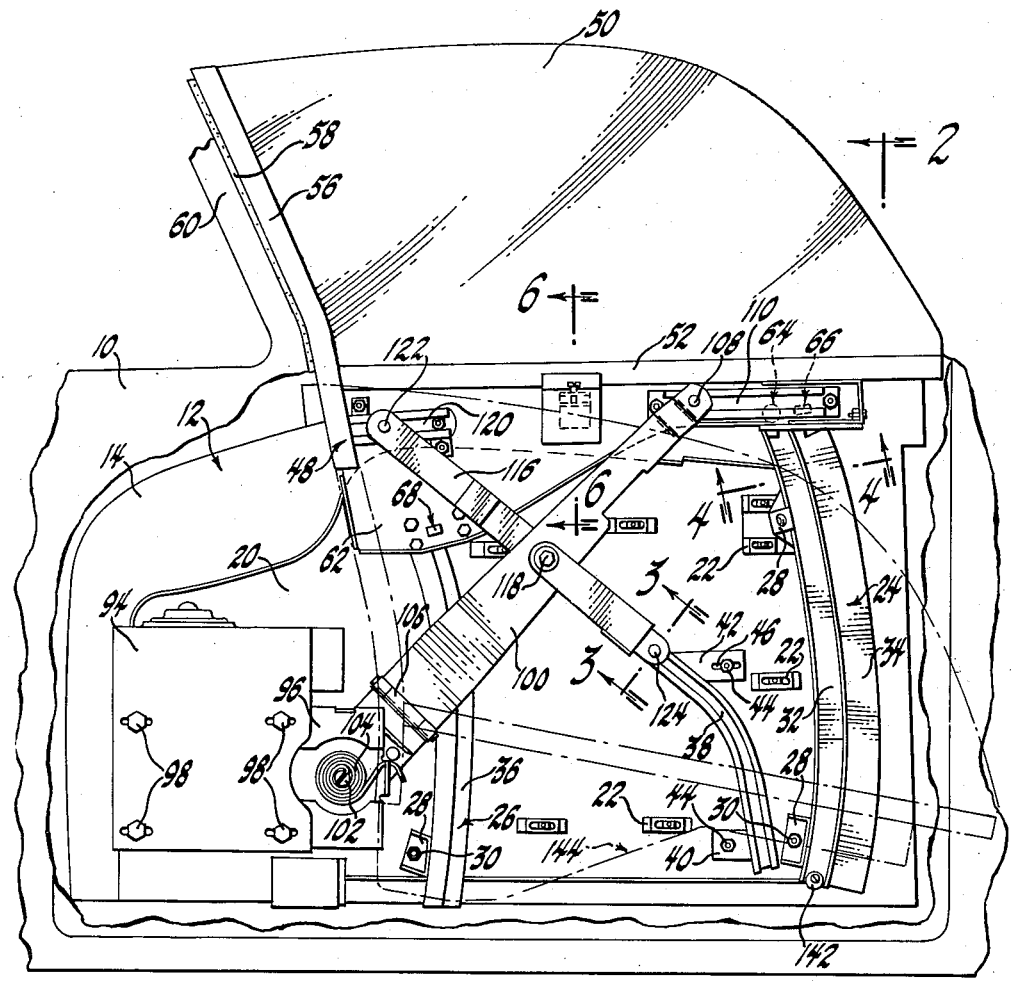
Figure 1 shows a fragmentary view of an automobile body having the proposed window regulator incorporated within a side door. A section of the door has been broken away to more clearly show the invention.

There is shown in Figure 1 a vehicle body 10 within which a vehicle door 12 is mounted. The vehicle door 12 includes an inner and outer door panel 14 and 16 secured together and spaced apart to form a chamber 18 within which the proposed window regulating mechanism is adapted to be housed. A backing plate 20 is secured to the inner door panel 14 as by fastening means 22 disposed in such locations as will provide the best support for the plate upon the door panel. Guide members 24 and 26 are secured to the backing plate 20 as by brackets 28 and fasteners 30. The one guide member 24 is convexly curved and formed to provide two separate guide tracks one of which is a channeled track 32 and the other of which is a flat rail track 34. The other guide member 26 includes merely a flat rail track 36. In between the guide members 24 and 26 a channeled guide member 38 is secured to the backing plate 20 as by brackets 40 and 42 and fastening means 44. The one bracket 42 is provided with an elongated slot 46 to enable adjustment of the channeled guide member 38 upon the backing plate.

A window receiving frame 48 is provided which is adapted to retain a window glass member 50 of compound curvature. The frame 48 includes a channeled member 52 having a gasket 54 and adapted to receive the lower extremity of the window glass member 50. A second channeled member 56 is secured to the leading edge of the glass member 50 and is preferably chrome plated. A weather seal 58 is secured to the channeled member 56 and is adapted to engage the pillar post 60 of the vehicle body 10 when the window is in the closed position. The window frame 48 also includes a depending plate 62 having the channeled members 52 and 56 secured thereto. Guide followers 64, 66 and 68 are secured to the depending plate 62. The one follower 64 comprises a roller 70 rotatable about a shaft 72 threaded at one end to receive a nut 74 and having a head 76 on the other end recessed within the roller and slotted as at 78 for adjustment. A collar 80 is provided about the shaft 72 and is welded to the plate 62 to hold the roller 70 in spaced relation from the plate. The roller 70 is adapted to be received within the channeled track 32 of the guide member 24. The other guide followers 66 and 68 comprise a bracket having forked arms 81 and 82 and secured to the backing plate as by fasteners 84. Rollers 86 and 88 are secured to the arms as by straps 90 holding down the roller pins 92. The rollers 86 and 88 are adapted to engage opposite sides of the rail tracks 34 or 36.

A window lift control box 94 within which an electric motor or other drive device and associated members are disposed is secured to the backing plate 20. A bracket 96 is secured to the control box 94 as by fasteners 98. A connecting arm 100, operatively connected to the drive means within the control box 94, is pivotally associated with the bracket 96 as about pivot pin 102. A coil spring 104 secured to the pivot pin and engaging the bracket 96 is adapted to assist the drive means in moving the connecting arm.

Figure 5:
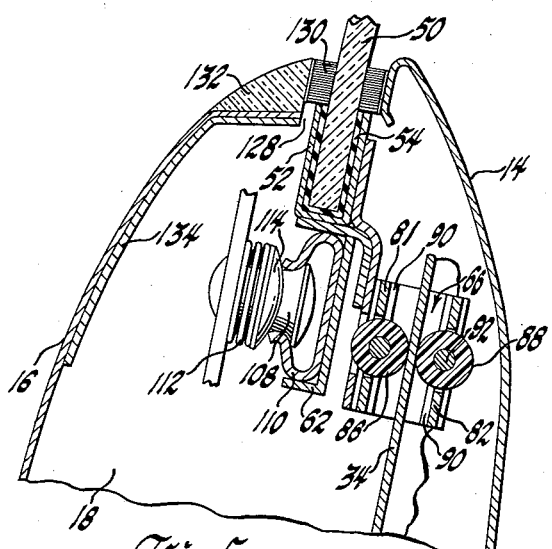
Figure 5 is an enlargement of a portion of Figure 2 showing certain pertinent features in more detail.
Figure 6:
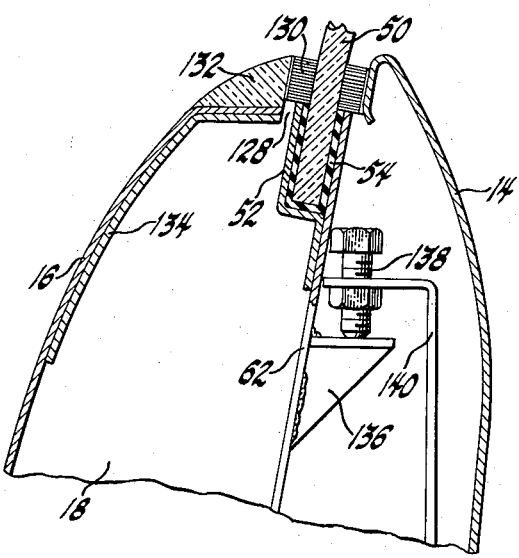
Figure 6 is a cross sectional view of the window stop device as taken in the plane of line 6—6 of Figure 1 and viewed in the direction of the arrows thereon.

The connecting arm 100 has a knob 108 secured to its outer end and slidably engaged within a grooved bracket 110 secured to the depending plate 62 of the window receiving frame 48. A coil spring 112 and spring collar 114 are provided about the knob 108, as is shown in Figure 5, to hold the knob in rattle-free engagement with the bracket 110. The connecting arm 100 is hinged as at 106 to enable greater flexibility of alignment between the depending plate 62 and the end of the connecting arm associated with the drive means.

A second arm 116 is pivotally secured to the connecting arm 100 as at 118. One end of the arm 116 is slidably engaged in a grooved bracket 120 secured to the depending plate 62 as by a knob or button 122 similar to that of the knob 108 and likewise spring biased. The other end of the arm 116 has a guide follower or roller 124 which is adapted to be engaged within the channeled guide member 38 as is shown in Figure 3. The lower end of the arm 116 having the roller 124 secured thereto is also formed to receive the connecting arm 100 as in jackknife folding action within a channel recess 126 formed therewithin.

An opening 128 is provided in the top of the vehicle door 12 where the inner and outer door panels 14 and 16 come together. The window glass member is adapted to be raised through the opening 128 to a closed position abutting the post 60 or to be lowered through the opening to within the vehicle door 12. Weather stripping 130 is secured within the opening 128 to the sides of the door forming the opening. An ornamental molding strip 132 is secured to the top of the outer door panel 16. In the present instance the molding strip 132 is of transparent material. A strengthening member 134 is secured to the inside of the outer door panel 16.

In order to limit the upward travel of the curved glass member a stop 136 is secured to the depending plate 62 and is adapted to be engaged by a bolt 138 threaded through a flanged bracket 140 secured to the door panel 14. The bolt 138 may be adjusted to regulate the extent of travel of the window glass member 50 to its raised position. A bumper element 142 is secured to the lower end of the guide member 24 to limit the travel of the window 50 to its lowered position such as is shown in phantom at 144.

With all of the elements forming the proposed window regulator secured to the backing plate 20, the backing plate is secured to the inner panel 14 of the vehicle door 12. The guide members 24, 26 and 38 are adjusted to assure freedom of travel of the window frame 48. The guide members 24 and 26 which are curved to complement the curvature of the window member 50 are so arranged on the backing plate 20 with the guide followers engaged thereon as will enable the window member 50 to be moved vertically through the opening 128 formed in the door 12 without undue strain or stress upon its side faces. The portion of the window member 50 passing through the opening 128 is at all times spaced from the sides of the opening, or lightly engaged with the weather stripping 130. In order to assure proper movement of the frame 48 along the guide members the grooved brackets 110 and 120 are also checked to assure a relatively effortless slidable connection between the knobs or buttons 108 and 122 of the lift arms 110 and 116 and the brackets. The hinged connection of the connecting arm 100 as at 106 requires that little attention be given the alignment of the arm since its flexibility transversely of its path of movement allows sufficient compensation for minor errors of alignment. Such flexibility also enables the arm 100 to follow the depending plate 62 as it is moved along the curved guide member 24.

With the window member 50 in the lowered position as shown in phantom at 144 the arms 100 and 116 are jackknifed together to provide a ridged cross brace. Restraint is imposed upon movement of the frame 48 and window member 50 transversely of its intended travel path by the guide followers 64 and 68 engaging respective guide members 26 and 38 and the brace formed by aligned arms 100 and 116 as well as the guide follower 66 engaging guide member 24 therebelow. Such restraint will prevent damage to the window member 50 when housed within the door as would otherwise be possible by slamming the door.

As the drive means disposed within the control box 94 are operated the connecting arm 100 engaged within the grooved bracket 110 on one end of the frame 48 tends to lift the frame. At the same time the second arm 116, being secured to the connecting arm 100 and engaged within the grooved bracket 120 secured to the other end of the frame 48 also tends to raise the frame. The two arms 100 and 116 unfold or open in scissor fashion. The frame is raised along the guide members 24 and 26 with the guide 38 restraining the end of arm 116 to assure proper lift and alignment of the glass member 50 as it passes through opening 128 of the door 12. When the window member 50 has reached its raised or closed position, with the weather seal 58 engaging the pillar post 60, the stop 136 is engaged by the bolt 138 and further travel upward is prohibited.

Lowering the window member 50 is a reversal of the given operation with downward travel limited by the engagement of the frame 48 with bumper element 142.

I claim.

1. In a vehicle body having a window opening therein, a vehicle window curved both longitudinally and laterally thereof and adapted to open and close said opening, a pair of spaced guide members, each having a guiding edge portion curved both longitudinally and laterally with respect to said window and extending generally longitudinally with respect thereto, spaced pairs of first guide rollers rotatably mounted on said window on generally longitudinally disposed axes with respect thereto, each pair slidably and rotatably receiving said guiding edge portion of one of said guide members therebetween for guiding lateral shifting movement of said window and permitting longitudinal shifting movement thereof, a guide channel on at least one of said guide members opening to said window and disposed adjacent said guiding edge portion thereof, said channel being curved both longitudinally and laterally with respect to said window, and a second guide roller rotatably mounted on said window on a generally laterally disposed axis with respect thereto and being slidably and rotatably received within said channel for guiding longitudinal shifting movement of said window and permitting lateral shifting movement thereof, said first and second guide rollers cooperatively guiding both lateral and longitudinal shifting movement of said window.

2. A movable panel regulator linkage comprising first and second rigid levers pivotally articulated together intermediate the ends thereof and having pivots at corresponding ends thereof to a panel to be regulated, one of said lever pivots permitting bodily shifting of said panel in reference to its pivotal axis, means to pivot one of said levers in opposite directions about a fixed axis which is opposed to its panel pivot in reference to the pivotal axis of articulation of the levers, and a fixed guide movably engaged by the other lever in a similar opposed relation of the same to its panel pivot, said guide having a formation controlling said other lever in the movement thereof, whereby to impart different movements of a simultaneous, composite pivotal, horizontal and vertical character to points on said panel located outwardly in reference to the respective panel-lever pivots.

3. A movable panel regulator linkage comprising first and second rigid levers pivotally articulated together intermediate the ends thereof to a panel to be regulated, said first lever pivot permitting rectilinear bodily shifting of said panel in reference to its pivotal axis, means to pivot said second lever in opposite directions about a fixed axis which is opposed to its panel pivot in reference to the pivotal axis of articulation of the levers, and a fixed guide movably engaged by said first lever in a similar opposed relation of the same to its panel pivot, said guide having an irregularly shaped, curvilinear formation controlling said first lever in the movement thereof, whereby to impart different movements of a simultaneous, composite pivotal horizontal and vertical character to points on said panel located outwardly in reference to the respective panel-lever pivots.

4. A window regulator mechanism for continuously imparting simultaneous translational and rotational components of movement to a window to move said window between open and closed positions along a curvilinear path comprising, a support, a pair of spaced curvilinear shaped guide means on said support, spaced guide follower means on said window respective to said guide means, each guide follower means being movable along a respective guide means for guiding movement of said window along said curvilinear path, a driving arm pivotally mounted on said support and pivotally connected to said window, a balance arm pivoted on said driving arm and pivotally connected to said window, curvilinear-shaped guide means mounted on said support and defining a predetermined curvilinear path, and means pivotally connecting said balance arm to said last mentioned guide means, said connecting means being movable along said predetermined curvilinear path as said driving arm imparts translational movement to said window to control swinging of said balance arm about said driving arm and thereby control rotational movement of said window about said pivotal connection of said driving arm to said window by said balance arm.

5. A window regulator mechanism for continuously imparting simultaneous translational and rotational components of movement to a window to move said window between open and closed positions along a curvilinear path comprising, a support, first and second spaced curvilinear shaped guide members on said support, spaced guide follower means on said window respective to said guide members, each guide follower means being movable along a respective guide member for guiding movement of said window along said curvilinear path, a driving arm pivotally mounted on said support and pivotally connected to said window, a balance arm pivoted on said driving arm and pivotally connected to said window, a third curvilinear-shaped guide member mounted on said support and defining a predetermined curvilinear path, and guide follower means pivotally connecting said balance arm to said third guide member, said last-mentioned guide follower means being movable along said predetermined curvilinear path as said driving arm imparts translational movement to said window to control swinging of said balance arm about said driving arm and thereby control rotational movement of said window about said pivotal connection of said driving arm to said window by said balance arm, said guide members being generally curved in the same direction with respect to the pivotal mounting of said driving arm on said support.

6. A window regulator mechanism for continuously imparting simultaneous translational and rotational components of movement to a window to move said window between open and closed positions along a curvilinear path comprising, a support, first and second spaced curvilinear-shaped guide members on said support, spaced guide followers on said window respective to said guide members, each guide follower being movable along a respective guide member for guiding movement of said window along said curvilinear path, a driving arm pivotally mounted on said support and pivotally connected to said window, a balance arm pivoted on said driving arm, a third guide member on said window, a guide follower pivotally connecting said window balance arm to said third guide member, a fourth guide member mounted on said support, a guide follower pivotally connecting said balance arm to said fourth guide member, at least one of said third and fourth guide members defining a predetermined curvilinear path, the guide follower respective to said one of said guide members being movable along said predetermined curvilinear path as said driving arm imparts translational movement to said window to control swinging of said balance arm about said driving arm and thereby control rotational movement of said window about said pivotal connection of said driving arm to said window by said balance arm.

7. A window regulator mechanism for continuously imparting simultaneous translational and rotational components of movement to a window to move said window between open and closed positions along a curvilinear path comprising, a support, a driving arm pivotally mounted on said support and pivotally connected to said window, a balance arm pivoted intermediate its ends on said driving arm, means pivotally connecting one end of said balance arm to said window, guided means, guide means mounting said guided means on said support for movement in a predetermined curvilinear path, said guided means pivotally connecting the other end of said balance arm to said guide means, said guided means being continuously movable along said predetermined curvilinear path as said driving arm imparts translational movement to said window to control swinging of said balance arm about said driving arm and thereby control rotational movement of said window about the pivotal connection of said driving arm to said window by said balance arm, said driving arm imparting translational components of movement to said window and said balance arm and guided means simultaneously imparting continuous components of rotational movement to said window to cause said window to move between open and closed positions along a curvilinear path.

8. A window regulator mechanism for continuously imparting simultaneous translational and rotational components of movement to a window to move said window between open an closed positions along a curvilinear path comprising, a support, a driving arm pivotally mounted on said support and pivotally connected to said window, a balance arm pivoted intermediate its ends on said driving arm, means pivotally connecting one end of said balance arm to said window, guided means, guide means mounting said guided means on said support for movement in a predetermined curvilinear path, said guided means pivotally connecting the other end of said balance arm to said guide means, said guided means being continuously movable along said predetermined curvilinear path as said driving arm imparts translational movement to said window to control swinging said balance arm about said driving arm in a direction opposite the direction of movement of said driving arm and thereby control rotational movement of said window about the pivotal connection of said driving arm to said window by said balance arm, said driving arm imparting translational components of movement to said window and said balance arm and guided means simultaneously imparting continuous components of rotational movement to said window to cause said window to move between open and closed positions along a curvilinear path.

9. A window regulator mechanism for continuously imparting simultaneous translational and rotational components of movement to a window to move said window between open and closed positions along a curvilinear path comprising, a support, a pair of spaced curvilinear shaped guide means on said support, spaced guide follower means on said window respective to said guide means, each guide follower means being movable along a respective guide means for guiding movement of said window along said curvilinear path, a driving arm pivotally mounted on said support and pivotally connected to said window, a balance arm pivoted on said driving arm and pivotally connected to said window, guided means, guide means mounting said guided means on said support for movement in a predetermined curvilinear path, said guided means pivotally connecting said balance arm to said guide means, said guided means being movable along said predetermined curvilinear path as said driving arm imparts translational movement to said window to control swinging of said balance arm about said driving arm and thereby control rotational movement of said window about said pivotal connection of said driving arm to said window by said balance arm.

References Cited in the file of this patent

UNITED STATES PATENTS

| | | |
|---|---|---|
| 2,746,747 | Lautenbach | May 22, 1956 |
| 2,763,508 | Gelfond et al. | Sept. 18, 1956 |